United States Patent

Abler et al.

[11] Patent Number: 5,792,497
[45] Date of Patent: Aug. 11, 1998

[54] METHOD AND APPARATUS FOR PRODUCING TWISTED STRING CHEESE PRODUCTS

[75] Inventors: Joseph H. Abler, Brookfield; Eva Heim, Beaver Dam, both of Wis.

[73] Assignee: Stainless Steel Fabricating, Inc., Columbus, Wis.

[21] Appl. No.: 891,289

[22] Filed: Jul. 10, 1997

[51] Int. Cl.$^6$ .................. A23C 19/00; B29C 31/00
[52] U.S. Cl. .................. 426/516; 99/452; 99/535; 425/71; 425/131.5; 425/319; 425/462; 426/506; 426/517; 426/582
[58] Field of Search .................. 426/582, 506, 426/516, 517; 99/452, 535; 425/71, 131.5, 319, 462, 463; 264/172.14, 211.22, 339, 295

[56] References Cited

U.S. PATENT DOCUMENTS

| | | | |
|---|---|---|---|
| 3,468,354 | 9/1969 | Reachert | 425/162 |
| 4,112,835 | 9/1978 | Mongiello | 99/455 |
| 4,288,465 | 9/1981 | Meyer | 426/582 |
| 4,492,550 | 1/1985 | Levine | 425/142 |
| 4,613,294 | 9/1986 | Rose et al. | 425/438 |
| 4,815,368 | 3/1989 | Nelles | 99/452 |
| 4,902,523 | 2/1990 | Fritchen et al. | 99/452 |

Primary Examiner—George Yeung
Attorney, Agent, or Firm—Quarles & Brady

[57] ABSTRACT

A cheese processing machine includes an extruder assembly for forming the cheese into a string. The disclosed assembly has two extruders each forcing a different type of cheese in a plastic state into separate chambers of an extrusion head. The extrusion head has a series of apertures with each one communicating with both the first and second chambers, wherein cheese from each chamber is extruded simultaneously through each aperture to produce a string with both types of cheese. The extruded cheese string travel along brine filled troughs while a tube over each trough directs a plurality of brine streams which strike each cheese string and apply a torque which twists the string lengthwise. The cheese cools as it moves along the trough fixing the twisted shape of the string.

17 Claims, 3 Drawing Sheets

METHOD AND APPARATUS FOR PRODUCING TWISTED STRING CHEESE PRODUCTS

BACKGROUND OF THE INVENTION

The present invention relates to cheese processing methods and machinery; and more particularly to production of string cheese products.

In cheese processing machinery, such as described in U.S. Pat. No. 4,112,835, heated cheese is transferred from a cooker to a molder/chiller. The highly viscous cheese is conveyed by an auger to a chamber located beneath a conveyor or rotating platform carrying molds having shapes which correspond to a desired shape of the finished cheese product. As the empty molds pass over this chamber, heated cheese is forced up into the molds through openings to fill them with the proper amount of cheese. The viscous cheese takes on the shape of the mold which is conveyed through a chiller to cool and solidify the cheese. The cooled cheese is ejected from the molds as they leave the chiller to form the shaped cheese product.

Mozzarella cheese may be extruded into strings, as an alternative to being molded. The viscous cheese is forced through a series of circular holes in a die to produce strings of cheese. The cheese emerging from the die is extremely sticky and will adhere to surfaces of the material handling equipment. To prevent the warm cheese stings form sticking to each other and to the processing equipment, each strand emerging from the mold enters a separate trough containing a brine solution and travels along the trough floating on the brine. This allows the cheese to cool, thereby and losing the stickiness before coming into contact with other surfaces. Eventually the cooled cheese string is cut into predefined lengths and packaged.

SUMMARY OF INVENTION

A general object of the present invention is to provide a method and apparatus for producing string cheese.

Another object of the present invention is to a method and apparatus for producing string cheese that has a longitudinal twist.

A further object is to enable the degree of twist to be varied to suit desires of the cheese maker.

Yet another object of the present invention is to provide an apparatus which produces strings of cheese in which each string is formed of two different types or colors of cheese both extending along the length of the string.

A still further object enable control of the proportion of each type of cheese in the final product.

These and other objects are fulfilled by an apparatus comprising an extruder assembly for forming cheese in a plastic state into a string. The extruded string of cheese is received into a trough that contains a liquid, such as a brine solution of sodium chloride. The string travels along the trough floating on the liquid which prevents the cheese from sticking to walls of the trough.

A mechanism produces a plurality of fluid streams along the trough wherein the plurality of fluid streams strike the string of cheese. The impact of the fluid streams with the cheese string applies a torque which twists the string lengthwise. By controlling the rate of travel of the cheese string along the trough and the pressure of the fluid streams, the amount of twist imparted to the cheese string can be varied. The brine solution also cools and solidifies as the cheese travels along the trough which fixes the twist in the cheese string. Thereafter the string can be cut into segments of a desired length for packaging.

Another aspect of the present invention is a novel extruder assembly which has two extruder units in order to produce a string formed of two different types of cheese. The first extruder unit receives one type of cheese which is forced by driver through a first outlet. The second extruder unit receives another type of cheese which is forced by a different driver through a second outlet. An extrusion head is connected to the first and second extruder units. The extrusion head includes a first chamber into which cheese from the first outlet is injected and a second chamber into which cheese from the second outlet is injected. The extrusion head further includes at least one aperture communicating with both the first and second chambers, wherein cheese from each chamber can be forced simultaneously through each aperture to form strings consisting of both types of cheese.

DETAILED DESCRIPTION OF THE INVENTION

Figure 1:
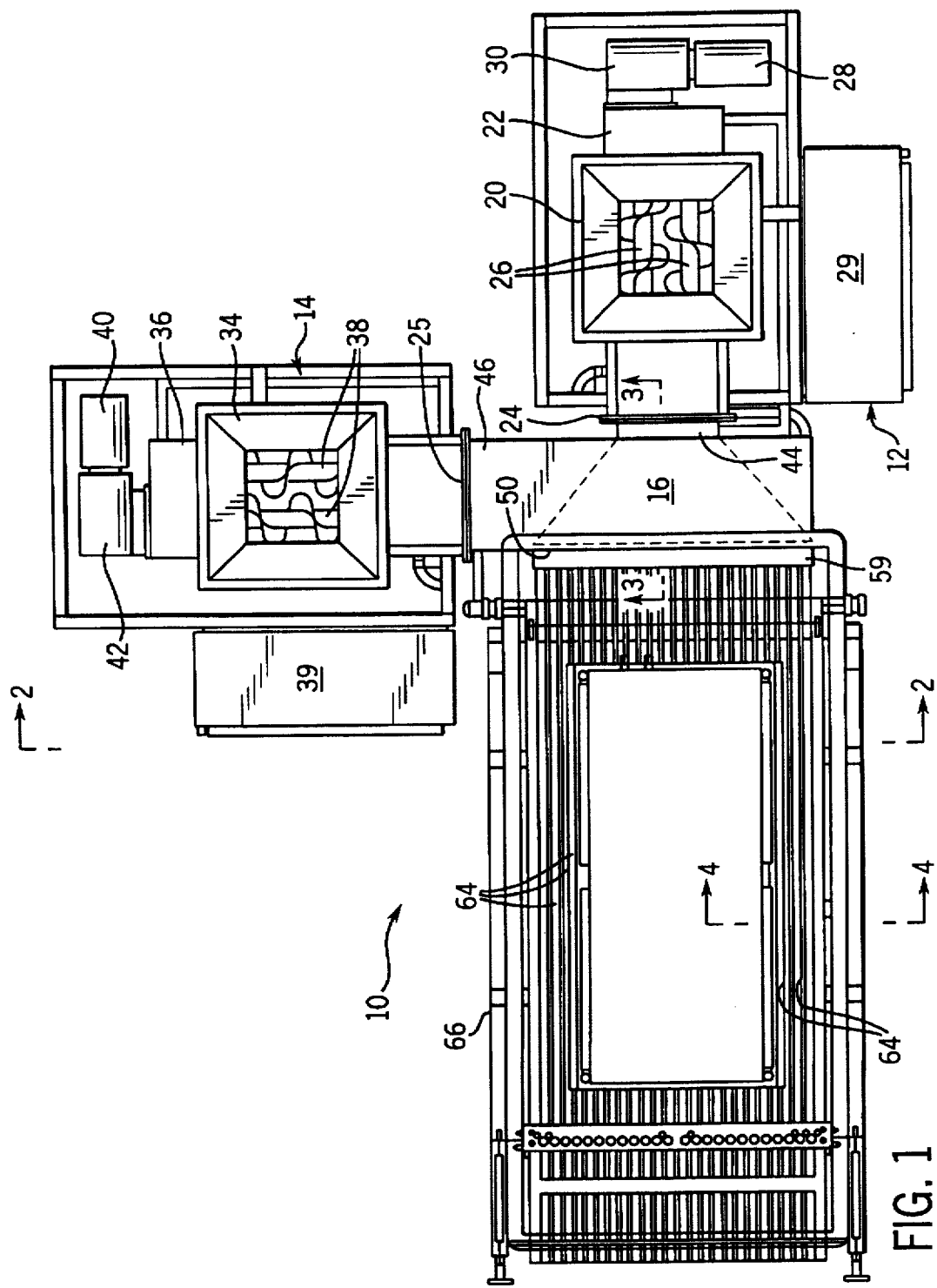
FIG. 1 is a top view of string cheese production machinery according to the present invention.
Figure 2:
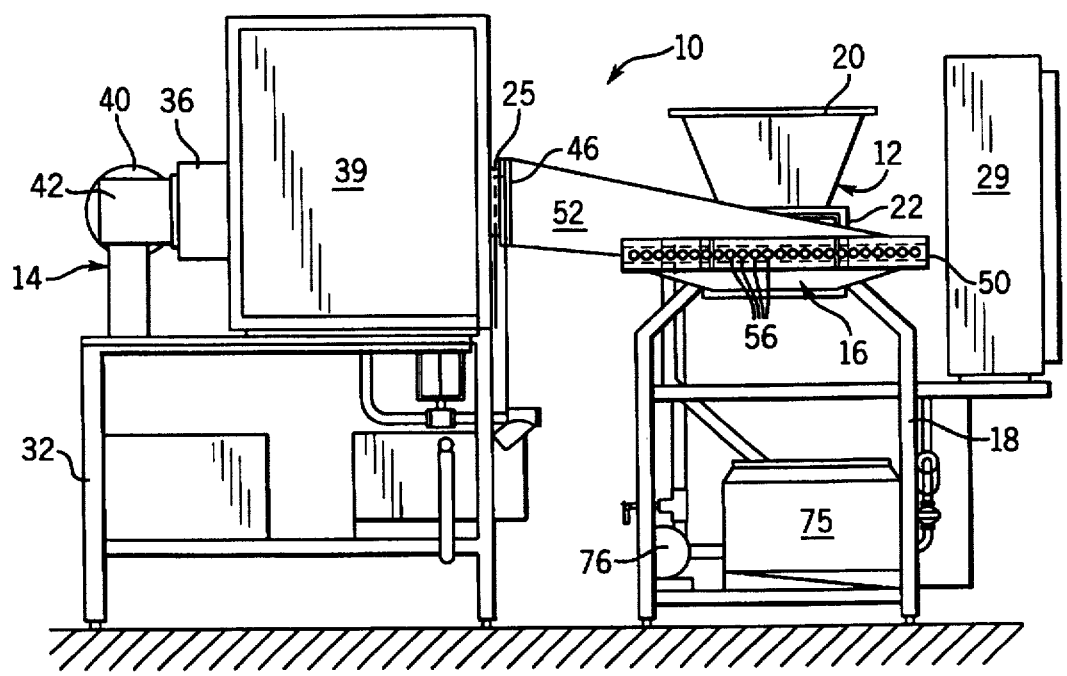
FIG. 2 is a cross-sectional view along line 2—2 in FIG. 1.

With initial reference to FIGS. 1 and 2, a string cheese production machine 10 includes a first extruder 12 and a second extruder 14 positioned orthogonal to each other for delivering viscous cheese to a common extrusion head 16.

The first extruder 12, mounted on a frame 18, includes a hopper 20 and a housing 22 to which the lower end of the hopper is mounted. The hopper 20 has an open top through which the hopper is filled with heated cheese in a plastic state. For example, as is well known in the art, a separate mixer having a chamber with a warm water jacket may be used to knead cheese curd, thereby cementing the curd into a cheese mass which flows as a warm plastic fluid into the hopper 20. Within the housing 22 are a pair of rotating augers 26, which are driven by a variable speed electric motor 28 through a suitable transmission 30.

The warm, plastic cheese flows downward through the hopper 20 into the housing 22 where the cheese is carried along by the two augers 26. As is standard practice, warm water may surround the housing 22 in order to maintain the cheese in a plastic, fluid state. The rotating augers 26 force the plastic cheese through the housing 22 into the extrusion head 16 which is rigidly connected to an outlet 24 of the housing.

The second extruder 14 is identical in design to the first extruder 12 with the exception that the second extruder in elevated on a frame 33 slightly above the first extruder. Second extruder 14 has a hopper 34 through which a different type of cheese in a plastic state drops into housing 36 and then the cheese is forced by another pair of rotating augers 38 into another section of the extrusion head 16. The second extruder 14 has a variable speed electric motor 40 which drives the second pair of augers through a transmission 42.

Figure 3:
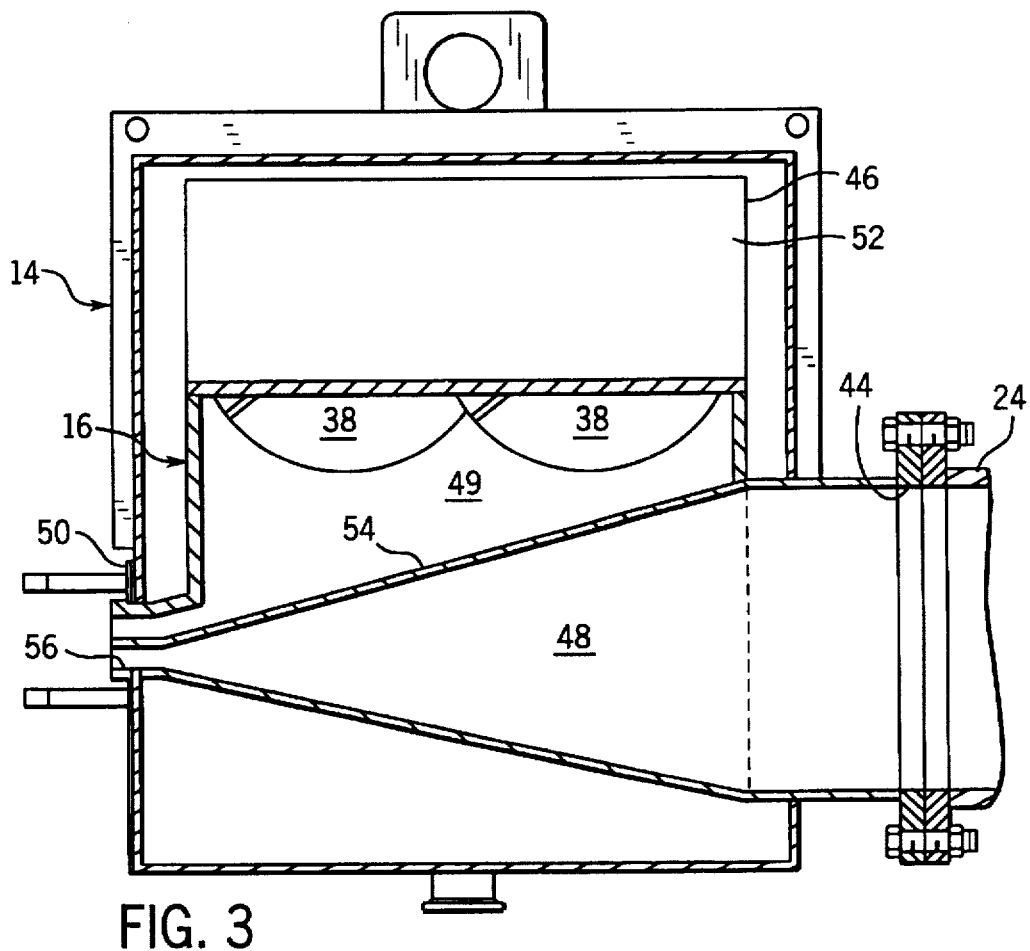
FIG. 3 is a cross-sectional view along line 3—3 in FIG. 1 showing the two-cheese extrusion head.

The extrusion head 16 has a first cheese inlet 44 connected to the outlet 24 of the first extruder 12 and a second cheese inlet 46 connected to the outlet 25 of the second extruder 14. With particular reference to FIG. 3, each inlet 44 and 46 communicates with a separate chamber 48 and 49, respectively, of the extrusion head 16. The first inlet 44 feeds into the first chamber 48 which tapers vertically going from the inlet 44 to a smaller cross sectional area at end plate 50. The first chamber 48 widens in the horizontal direction going from the inlet 44 to the end plate 50, as seen in FIG. 2. The second inlet 46 is at one end of a chute 52 which directs the cheese from the second extruder 14 into the second chamber 49 on top of the first chamber 48. An interior wall 54, separating the first and second chambers 48 and 49, further directs this second cheese flow at a right angle toward the end plate 50.

The end plate 50 of extrusion head 16 has a plurality of circular cross-section apertures 56 with the interior wall 54 bisecting each of these apertures 56. Other aperture shapes may be used to impart different cross sectional shapes to the string cheese. As a result of this aperture configuration, cheese from the first extruder 12 is squeezed from the first chamber 48 through the lower half of each aperture 56, as is evident from FIG. 3. Similarly, cheese from the second extruder 14 is squeezed from the second chamber 49 through the upper half of each aperture 56. If the first and second extruders 12 and 14 are supplied with different types of cheese, e.g. mozzarella and cheddar, the strings of cheese 58 extruded through apertures 56 will have the different types of cheese lengthwise along the top and bottom portions 60 and 62, as shown in FIG. 4.

By varying the rotational speed of the augers 26 and 38 in the two extruders 12 and 14, the amount of each type of cheese extruded into the string 58 can be varied. When one extruder operates substantially faster that the other, the resultant string 58 will have a proportionately greater amount of the type of cheese from the faster extruder. The speed of each pair of augers 26 and 38 is set by conventional controllers 29 and 39 for motors 28 and 38.

Figure 4:
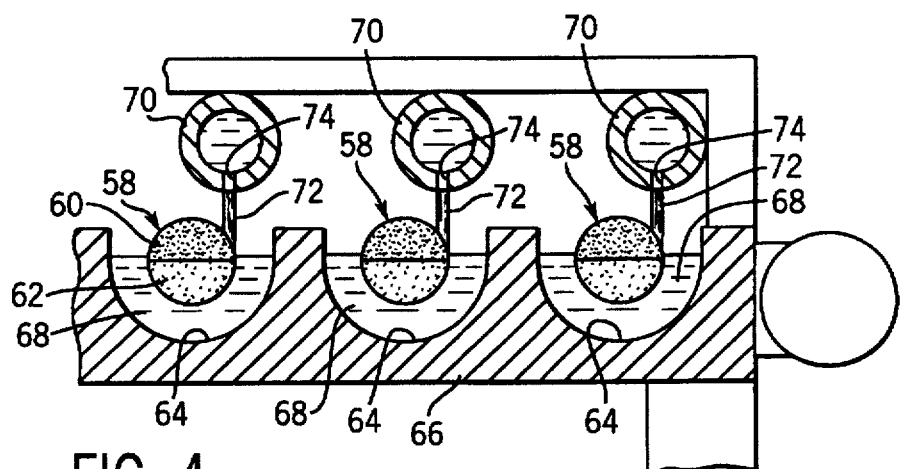
FIG. 4 is a cross-sectional view along line 4—4 in FIG. 1 showing the mechanism for twisting the cheese.

Referring to FIGS. 1 and 4, the cheese ejected from the apertures 56 pass through an individual tube array 59 attached to the end plate 50 of extrusion head 16 in which tubes the cheese combines into single strings with portions 60 and 62 formed by each type of cheese. The strings 58 drop from this tube array 59 into separate troughs 64 in a table 66. The troughs 64 extend the length of table 66 and contain a brine solution 68 of sodium chloride which cools the strings. The cheese strings 58 float in the brine solution thereby enabling the strings to be pushed the length of the table 66 without sticking to the walls of the troughs 64.

Above each trough 64 is a separate horizontal tube 70 that extends parallel to and slightly offset from the longitudinal axis of the trough. For example, if the width of the trough 64 is one inch and the diameter of the cheese string 58 is about one-half inch, the longitudinal axis of the tube 70 is one-quarter inch to one side of the longitudinal axis of the trough. A plurality of holes 74 are located in the bottom of each tube spaced along the length of the tube. For example, there may be eighteen holes 74 each 0.032 inch in diameter spaced two inches center. One end of every tube 70 is connected to the output of a pump 76 (FIG. 2) having an input coupled to a brine reservoir 75.

A brine solution is pumped through the tubes 70 creating a series of fluid jets, or streams, 72 which strike one side of the cheese strings 58 moving along the troughs 64. The fluid streams 72 apply a torque to the cheese strings 58 which causes the strings to rotate in a clockwise direction in the orientation of FIG. 4. Because the originating end of each cheese string 58 coming through the extrusion head 16 is prevented from turning, the rotating action twists the stings. For example, a fluid pressure of 30 psi produces a 360° turn every five inches when the cheese string 58 is moving at two inches per second along the trough 64. Even if a cheese string 58 moves transversely so that a stream 72 does not strike the cheese, the turbulent flow of the brine in the trough due to the stream will impart torque to the cheese string.

When the twisted cheese string reaches the end of the table 66 that is remote from the extrusion head 16, the strings 58 have cooled sufficiently to have solidified to fix the twisted shape. A conventional cutter (not shown) is located at the remote end of the table 66 and divides the cheese strings 58 into segments of a desired length for packaging. The cut string cheese segments then drop into a standard brine bath (not shown) as found in previous string cheese production lines.

I claim:

1. An apparatus for producing a string of cheese, said apparatus comprising:

an extruder assembly for forming the cheese into a string;

a trough adjacent to the extruder and containing a liquid, wherein the string from the extruder is received in and travels along the trough; and a mechanism for producing a plurality of fluid streams along the trough wherein the plurality of fluid streams strike the string of cheese and apply a torque which twists the string lengthwise.

2. The apparatus as recited in claim 1 wherein the mechanism comprises a tube located parallel to the trough and having a plurality of apertures spaced along the tube at which the plurality of fluid streams are generated.

3. The apparatus as recited in claim 1 wherein the trough has a first longitudinal axis; and the mechanism comprises a tube having a second longitudinal axis which is parallel to and offset horizontally from the first longitudinal axis, the tube having a plurality of apertures spaced along the tube at which the plurality of fluid streams are generated.

4. The apparatus as recited in claim 1 wherein the mechanism directs the plurality fluid streams to strike the string of cheese.

5. The apparatus as recited in claim 1 wherein the liquid and the fluid streams are a brine solution.

6. The apparatus as recited in claim 1 wherein the extruder assembly comprises:

a first extruder having an opening for receiving a first type of cheese and having a first driver that forces the first type of cheese through a first outlet;

a second extruder having an opening for receiving a second type of cheese and having a second driver that forces the second type of cheese through a second outlet; and an extrusion head having a first chamber with a first inlet connected to the first outlet of the first extruder and having a second chamber with a second inlet connected to the second outlet of the second extruder, the extrusion head further including an aperture communicating with both the first chamber and the second chamber wherein cheese from each chamber can be forced simultaneously through the aperture to form the string.

7. The apparatus as recited in claim 6 wherein the first and second drivers each comprise an auger.

8. The apparatus as recited in claim 6 wherein the extruder assembly further comprises a tube communicating with the aperture of the extrusion head for receiving the first and second types of cheese simultaneously passing through the aperture.

9. A method for producing a twisted string of cheese, said method comprising steps of:

forming the cheese into a string;

moving the string along a trough containing a liquid; and producing a plurality of fluid streams spaced along the trough which apply a torque which twists the string lengthwise.

10. The method as recited in claim 9 wherein the step of forming comprises extruding the cheese into a string.

11. The method as recited in claim 9 wherein the step of producing a plurality of fluid streams directs the plurality of fluid streams to strike the string moving along a trough.

12. An apparatus for producing a string of two types of cheese, said apparatus comprising:

a first extruder having an opening for receiving a first type of cheese and having a first driver that forces the first type of cheese through a first outlet;

a second extruder having an opening for receiving a second type of cheese and having a second driver that forces the second type of cheese through a second outlet;

an extrusion head having a first chamber with a first inlet connected to the first outlet of the first extruder and having a second chamber with a second inlet connected to the second outlet of the second extruder, the extrusion head further including an aperture communicating with both the first chamber and the second chamber wherein cheese from each chamber can be forced simultaneously through the aperture to form the string.

13. The apparatus as recited in claim 12 wherein the first and second drivers each comprises an auger.

14. The apparatus as recited in claim 12 further comprising a trough adjacent to the aperture of the extrusion head, wherein the string from the extruder is received in and travels along the trough.

15. The apparatus as recited in claim 14 further comprising a mechanism for producing a plurality of fluid streams along the trough wherein the plurality of fluid streams apply a torque which twists the string lengthwise.

16. The apparatus as recited in claim 14 further comprising a mechanism for producing a plurality of fluid streams along the trough wherein the plurality of fluid streams strike the string of cheese and apply a torque which twists the string lengthwise.

17. The apparatus as recited in claim 14 further comprising a tube communicating with the aperture of the extrusion head for receiving the first and second types of cheese simultaneously passing through the aperture.

* * * * *